(12) United States Patent
Yi

(10) Patent No.: US 12,011,863 B2
(45) Date of Patent: Jun. 18, 2024

(54) EQUIPMENT OF FORMING LAYERING STRUCTURE OF PLASTIC FLOORING

(71) Applicant: Lu Ding Yi, JiangSU (CN)

(72) Inventor: Lu Ding Yi, JiangSU (CN)

( * ) Notice: Subject to any disclaimer, the term of this patent is extended or adjusted under 35 U.S.C. 154(b) by 744 days.

(21) Appl. No.: 17/037,686

(22) Filed: Sep. 30, 2020

(65) Prior Publication Data

US 2021/0008779 A1    Jan. 14, 2021

Related U.S. Application Data

(63) Continuation-in-part of application No. 15/604,689, filed on May 25, 2017, now abandoned.

(51) Int. Cl.
*B29C 48/21* (2019.01)
*B29C 48/00* (2019.01)
(Continued)

(52) U.S. Cl.
CPC ........ *B29C 48/465* (2019.02); *B29C 48/0011* (2019.02); *B29C 48/0012* (2019.02); *B29C 48/0021* (2019.02); *B29C 48/07* (2019.02); *B29C 48/21* (2019.02); *B29C 48/265* (2019.02); *B29C 48/307* (2019.02); *B29C 48/495* (2019.02); *B29C 48/92* (2019.02); *E04F 15/107* (2013.01); *B29C 48/49* (2019.02); *B29C 48/503* (2019.02); *B29L 2007/002* (2013.01)

(58) Field of Classification Search
CPC ............. B29C 48/0011; B29C 48/0012; B29C 48/0021; B29C 48/07; B29C 48/08; B29C 48/21; B29C 48/265; B29C 48/307; B29C 48/49; B29C 48/495
See application file for complete search history.

(56) References Cited

U.S. PATENT DOCUMENTS

2016/0101555 A1* 4/2016 Knipp ................. B29C 48/0012
                                                         264/45.9
2018/0178487 A1* 6/2018 Chen ..................... E04F 15/107

FOREIGN PATENT DOCUMENTS

CN          105908946    *  8/2016   .......... B29C 48/002
WO    WO-2019134632 A1 *  7/2019

OTHER PUBLICATIONS

English translation of CN 105908946, Aug. 2016. (Year: 2016).*
English translation of WO 2019134632, Jul. 2019. (Year: 2019).*

* cited by examiner

*Primary Examiner* — Xiao S Zhao
*Assistant Examiner* — Joseph S Leyson
(74) *Attorney, Agent, or Firm* — Chun-Ming Shih; LANWAY IPR SERVICES

(57) ABSTRACT

Equipment of forming layering structure of plastic flooring contains: a co-extrusion unit, a first rolling mechanism, a second rolling mechanism, and a roller unit. The co-extrusion unit includes a first extruder, a second extruder, a third extruder, and a material distributor. A respective one of multiple guide tubes is defined between an opening of each of the first, second, third extruders and the material distributor, and the material distributor has multiple conduits configured to gather melted plastic materials from the first, second, third extruders, and a substrate is extrusion molded from a supply head of the material distributor. The roller unit is mounted on a support frame and includes a first delivery roller, a second delivery roller, a contact roller, two pattern rollers, a first guide roller, a second guide roller, and a third guide roller which are arranged along a horizontal direction of the support frame.

3 Claims, 5 Drawing Sheets

(51) Int. Cl.
*B29C 48/07* (2019.01)
*B29C 48/265* (2019.01)
*B29C 48/305* (2019.01)
*B29C 48/465* (2019.01)
*B29C 48/49* (2019.01)
*B29C 48/495* (2019.01)
*B29C 48/92* (2019.01)
*E04F 15/10* (2006.01)
*B29C 48/50* (2019.01)
*B29L 7/00* (2006.01)

EQUIPMENT OF FORMING LAYERING STRUCTURE OF PLASTIC FLOORING

This application is a Continuation-in-Part of application Ser. No. 15/604,689, filed May 25, 2017.

BACKGROUND OF THE INVENTION

Field of the Invention

The present invention relates to equipment of forming layering structure of plastic flooring.

Background of the Invention

Referring to FIG. 9, conventional equipment of forming plastic flooring contains four rollers vertically arranged, for example, the conventional equipment contains a support frame 1 on which a first delivery roller 3, a second delivery roller 4, a contact roller 5, and a fourth roller 6 are arranged from a bottom of the support frame upward, wherein the contact roller is configured to roller a substrate 7, a printing layer 8, and an abrasion resistant layer 9 by mating with the fourth roller 6. The contact roller 5 is configured to heat and soften the substrate 7. However, when rolling the substrate 7, the printing layer 8, and the abrasion resistant layer 9, the patterns are sharped because the substrate 7 is heated in a high temperature.

When the substrate 7, the printing layer 8, and the abrasion resistant layer 9 are rolled by the contact roller 5 in a short time and in a small contact area, air bubbles and uneven patterns produce.

The present invention has arisen to mitigate and/or obviate the afore-described disadvantages.

SUMMARY OF THE INVENTION

The primary objective of the present invention is to provide equipment of forming a layering structure of plastic flooring by which the layering structure is formed stiffly and flexibly.

Another objective of the present invention is to provide equipment of forming a layering structure of plastic flooring by which the layering structure is formed in an automation manner.

DETAILED DESCRIPTION OF THE PREFERRED EMBODIMENTS

Figure 1:
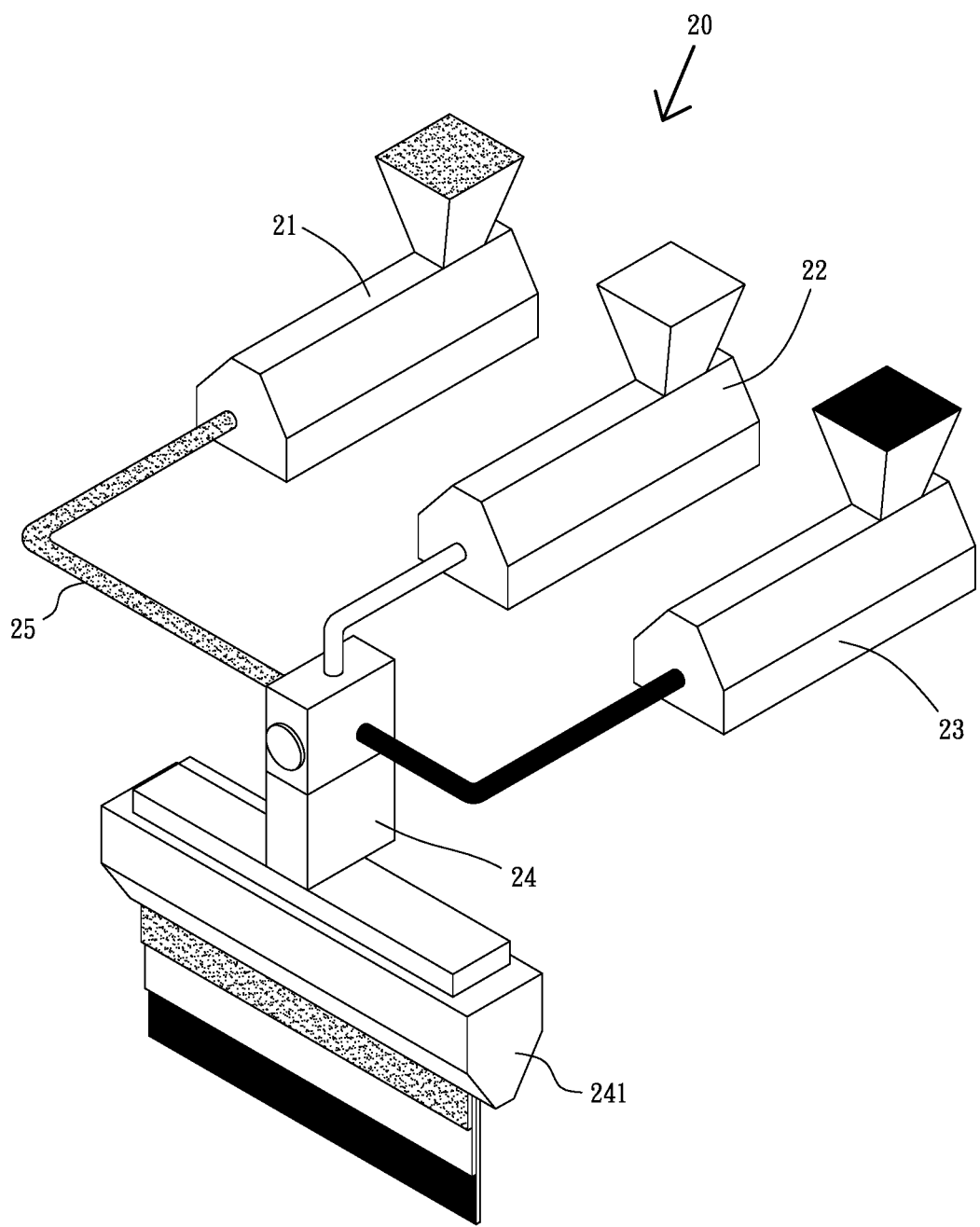
FIG. 1 is a schematic view of a co-extrusion unit of equipment of forming a layering structure of plastic flooring according to a preferred embodiment of the present invention.
Figure 2:
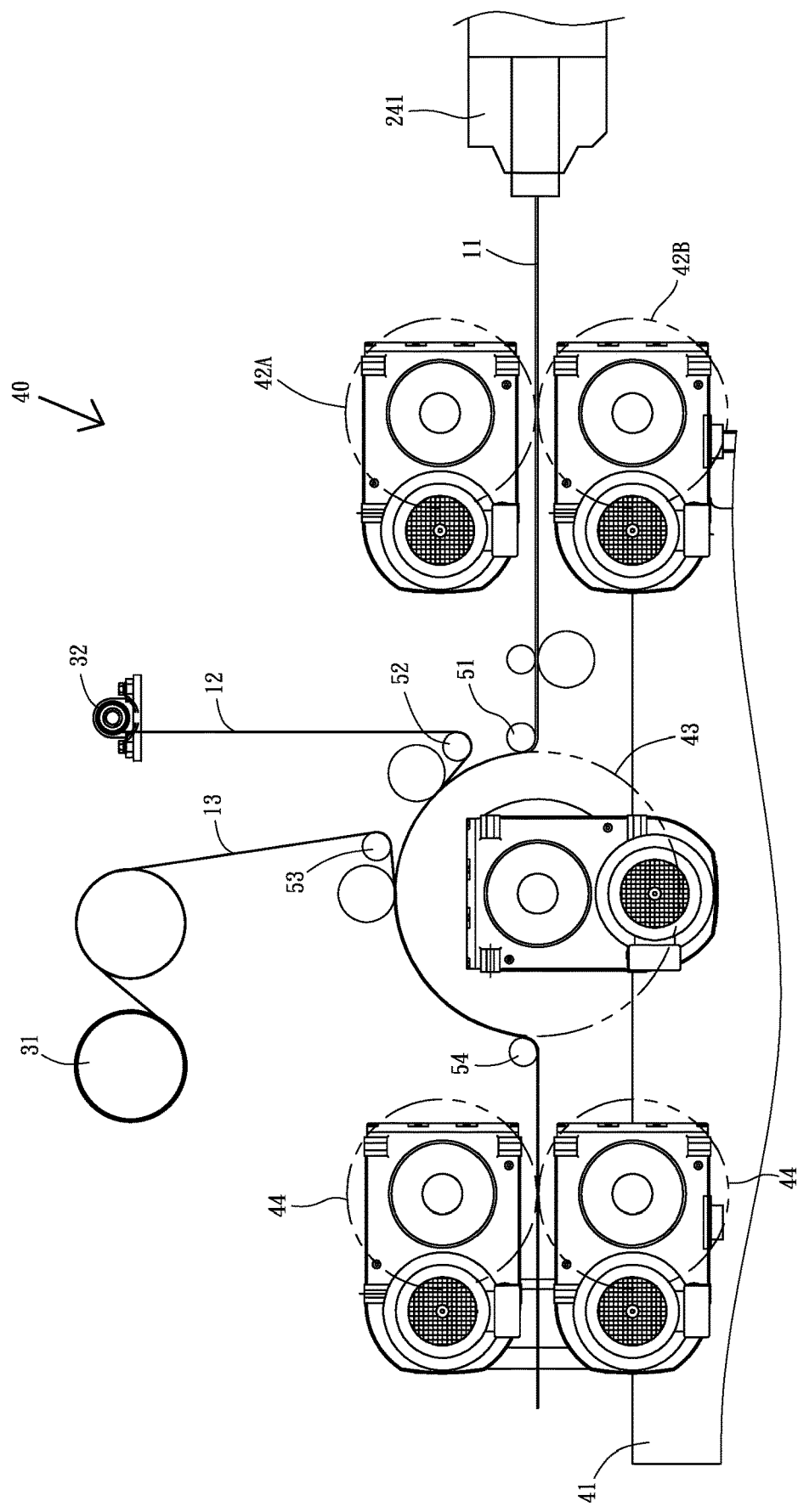
FIG. 2 is a schematic view of a roller unit of the equipment of forming the layering structure of the plastic flooring according to the preferred embodiment of the present invention.

With reference to FIGS. 1 to 8, equipment of forming layering structure of plastic flooring 10 according to a preferred embodiment of the present invention comprises: a co-extrusion unit 20, a first rolling mechanism 31, a second rolling mechanism 32, and a roller unit 40.

The co-extrusion unit 20 includes a first extruder 21, a second extruder 22, a third extruder 23, and a material distributor 24. The first, second, third extruders 21, 22, 23 are configured to extrude different melted plastic materials, and a respective one of multiple guide tubes 25 is defined between an opening of each of the first, second, third extruders 21, 22, 23 and a first end portion of the material distributor 24 so as to guide the melted plastic materials to the material distributor 24, wherein the material distributor 24 has multiple conduits configured to gather the melted plastic materials from the first, second, third extruders 21, 22, 23, and a substrate 11 is extrusion molded from a supply head 241 of a second end portion of the material distributor 24 opposite to the first end portion of the material distributor 24.

The first rolling mechanism 31 is configured to roll and to deliver the abrasion resistant layer 13 to the roller unit 40.

The second rolling mechanism 32 is configured to roll and deliver the printing layer 12 to the roller unit 40.

The roller unit 40 is mounted on a support frame 41 and includes a first delivery roller 42A, a second delivery roller 42B, a contact roller 43, two pattern rollers 44, a first guide roller 51, a second guide roller 52, and a third guide roller 53 which are arranged along a horizontal direction of the support frame 41, wherein the first delivery roller 42A is fixed above a top of the support frame 41, and the second delivery roller 42B is defined between the first delivery roller 42A and the support frame 41. Alternatively, the first delivery roller 42A is fixed beside an end of the support frame 41, and the second delivery roller 42B is defined between the first delivery roller 42A and the support frame 41. The contact roller 43 is located on the top or the end of the support frame 41 and beside the first delivery roller 42A and the second delivery roller 42B, corresponds to the co-extrusion unit 20 and to roll and press the substrate 11, the printing layer 12, and the abrasion resistant layer 13 to as to form the substrate 11 having a predetermined thickness and to deliver the substrate 11 to the two pattern rollers 44 opposite to the supply head 241 of the material distributor 24.

A diameter of the contact roller 43 is more than a diameter of each of the first delivery roller 42A and the second delivery roller 42B, the first guide roller 51 is arranged on the contact roller 43, the second guide roller 52 is arranged beside the contact roller 43 and the first guide roller 51, and the third guide roller 53 is fixed beside the contact roller 43 and the second guide roller 52 away from the first guide roller 51, wherein the first guide roller 51 is configured to deliver the substrate 11 to the contact roller 43, the second guide roller 52 is configured to deliver the printing layer 12 to the contact roller 43, and the third guide roller 53 is configured to deliver the abrasion resistant layer 13 to the contact roller 43, such that the substrate 11, the printing layer 12, and the abrasion resistant layer 13 are rolled and pressed by the contact roller 43 matingly, wherein the printing layer 12 stacks on the substrate 11, and the abrasion resistant layer 13 stacks on the printing layer 12 after the substrate 11, the printing layer 12, and the abrasion resistant layer 12 are rolled and pressed to produce the layering structure. Thereafter, the layering structure is transported by the contact roller 43 and a fourth guide roller 54 to the two pattern rollers 44 so as to form patterns on the layer structure, thus producing the plastic flooring 10.

A method of forming the layering structure of the plastic flooring 10 by using the equipment comprises steps of:

A) forming the substrate 11, wherein the first, second, third extruders 21, 22, 23 are configured to extrude different melted plastic materials, and the different melted plastic materials are delivered to the material distributor 24 via the multiple guide tubes 25, wherein the substrate 11 includes at least two sheets (such as a first sheet 111 and a second sheet 112), wherein a hardness of the first sheet 111 is different from a hardness of the second sheet 112, and the substrate 11 is delivered to the roller unit 40;

B) delivering the printing layer 12, wherein the printing layer 12 has predetermined textures formed on an outer surface thereof and is delivered to the roller unit 40 by the second rolling mechanism 32;

C) delivering the abrasion resistant layer 13, wherein the abrasion resistant layer 13 is delivered to the roller unit 40 by the first rolling mechanism 31;

D) rolling and pressing the substrate 11, the printing layer 12, and the abrasion resistant layer 13 by way of the roller unit 40 in following sub-steps of:

D1) forming the predetermined thickness of the substrate 11 and delivering the substrate 11 to the contact roller 43, wherein the substrate 11 is made of the different melted plastic materials from the supply head 241 of the material distributor 24 and is delivered to the contact roller 43 via the first delivery roller 42A, the second delivery roller 42B, and the first guide roller 51;

D2) delivering the printing layer 12 to the contact roller 43 via the second guide roller 52 so as to contact the printing layer 12 with the substrate 11 on the contact roller 43;

D3) delivering the abrasion resistant layer 13 to the contact roller 43 via the third guide roller 53 so as to contact and stack the abrasion resistant layer 13 with the printing layer 12 on the contact roller 43;

D4) contacting and stacking the substrate 11, the printing layer 12, and the abrasion resistant layer 12 on the contact roller 43 to form the layering structure, wherein the layering structure is delivered to the two patter rollers 44 via the fourth guide roller 54;

D5) forming the patterns on the layering structure 10 by using the two pattern rollers 44.

Accordingly, the roller unit 40 includes five rollers (i.e., the first delivery roller 42A, the second delivery roller 42B, the contact roller 43, and the two guide rollers 44), wherein the contact roller 43 is defined among the first delivery roller 42A, the second delivery roller 42B, and the two guide rollers 44 so that the substrate 11, the printing layer 12, and the abrasion resistant layer 13 are rolled and pressed by the contact roller 43 and are delivered to the two patterns 44 to be pressed once more, thus forming the patterns on the layering structure obviously.

The plastic flooring 10 comprises the substrate 11, the printing layer 12, and the abrasion resistant layer 13. The substrate 11 includes at least two sheets which are one-piece extrusion formed by using the co-extrusion unit 20 so that the at least one sheet stack together.

Figure 3:
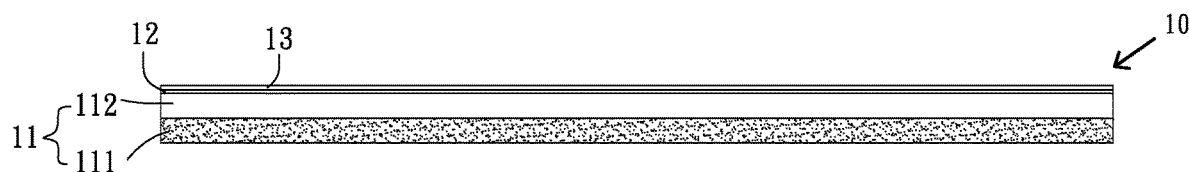
FIG. 3 is a schematic view showing the assembly of a layering structure of plastic flooring according to a preferred embodiment of the present invention.

Referring to FIG. 3, the substrate 11 includes a first sheet 111 made of PVC material in which plasticizer is added so that the first sheet 111 is flexible, and the substrate 11 includes a second sheet 112 located on the first sheet 111 and made of PVC material in which the plasticizer is not added so that the second sheet 112 is stiff. Alternatively, the first sheet 111 is made of foam material in which polyvinyl chloride (PVC) and inert gas are added. In another embodiment, the first sheet 111 is made of foam material in which foaming agent is added so that the first sheet 1 is stiff, and the second sheet 112 is made of PVC material in which the plasticizer is added so that the second sheet 112 is flexible.

Figure 4:
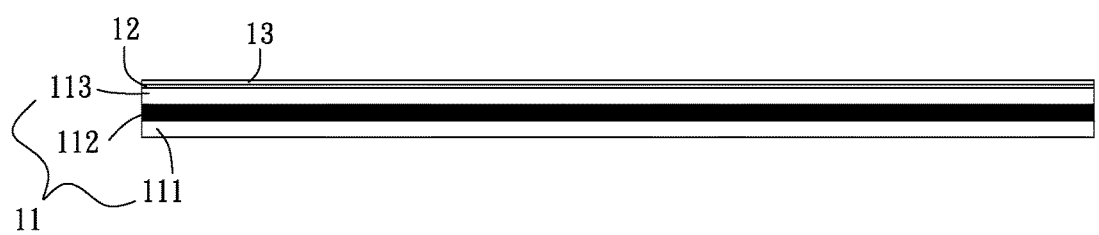
FIG. 4 is a schematic view showing the assembly of a layering structure of plastic flooring according to another preferred embodiment of the present invention.

As shown in FIG. 4, the substrate 11 includes a first sheet 111 made of PVC material in which plasticizer is not added so that the first sheet 111 is stiff, a second sheet 112 located on the first sheet 111 and made of PVC material in which vesicant is added so that the second sheet 112 is flexible, and a third sheet 113 located on the second sheet 112, wherein the third sheet 113 is made of PVC material in which the plasticizer is not added so that the third sheet 112 is stiff.

Figure 5:
FIG. 5 is a schematic view showing the assembly of a layering structure of plastic flooring according to another preferred embodiment of the present invention.

As illustrated in FIG. 5, the substrate 11 includes a first sheet 111 made of PVC material in which plasticizer is added so that the first sheet 111 is flexible, a second sheet 112 located on the first sheet 112 and made of PVC material in which vesicant is added so that the second sheet 112 is flexible, and a third sheet 113 located on the second sheet 112, wherein the third sheet 113 is made of PVC material in which the plasticizer is not added so that the third sheet 112 is stiff.

Figure 6:
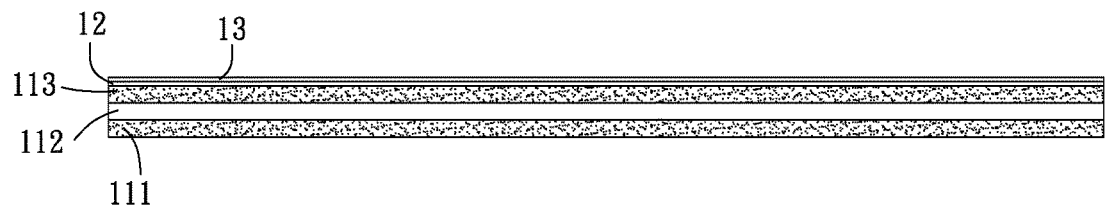
FIG. 6 is a schematic view showing the assembly of a layering structure of plastic flooring according to another preferred embodiment of the present invention.

With reference to FIG. 6, the substrate 11 includes a first sheet 111 made of PVC material in which plasticizer is added so that the first sheet 111 is flexible, a second sheet 112 made of PVC material in which vesicant is not added so that the second sheet 112 is stiff, and a third sheet 113 located on the second sheet 112, wherein the third sheet 113 is made of PVC material in which the plasticizer is added so that the third sheet 112 is flexible.

Figure 7:
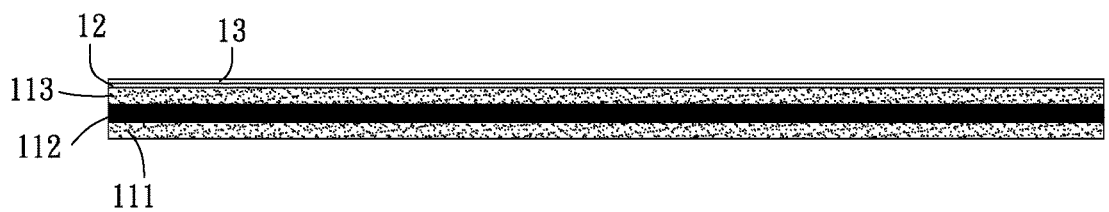
FIG. 7 is a schematic view showing the assembly of a layering structure of plastic flooring according to another preferred embodiment of the present invention.

Referring to FIG. 7, the substrate 11 includes a first sheet 111 made of PVC material in which plasticizer is added or is not added, wherein when the plasticizer is added in the PVC material of the first sheet 111, the first sheet 111 is flexible, and when the plasticizer is not added in the PVC material of the first sheet 111, the first sheet 111 is stiff. In addition, the substrate 11 includes a second sheet 112 located on the first sheet 111 and made of PVC material in which insert gas is fed so that the second sheet 112 foams and is flexible, and a third sheet 113 located on the second sheet 112, wherein the third sheet 113 is made of PVC material in which the plasticizer is added or is not added, wherein when the plasticizer is added in the PVC material of the third sheet 113, the third sheet 113 is flexible, and when the plasticizer is not added in the PVC material of the third sheet 113, the third sheet 113 is stiff.

Figure 8:
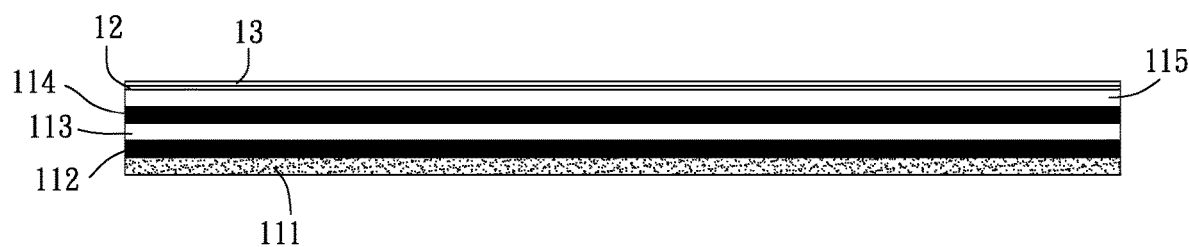
FIG. 8 is a schematic view showing the assembly of a layering structure of plastic flooring according to another preferred embodiment of the present invention.
Figure 9:
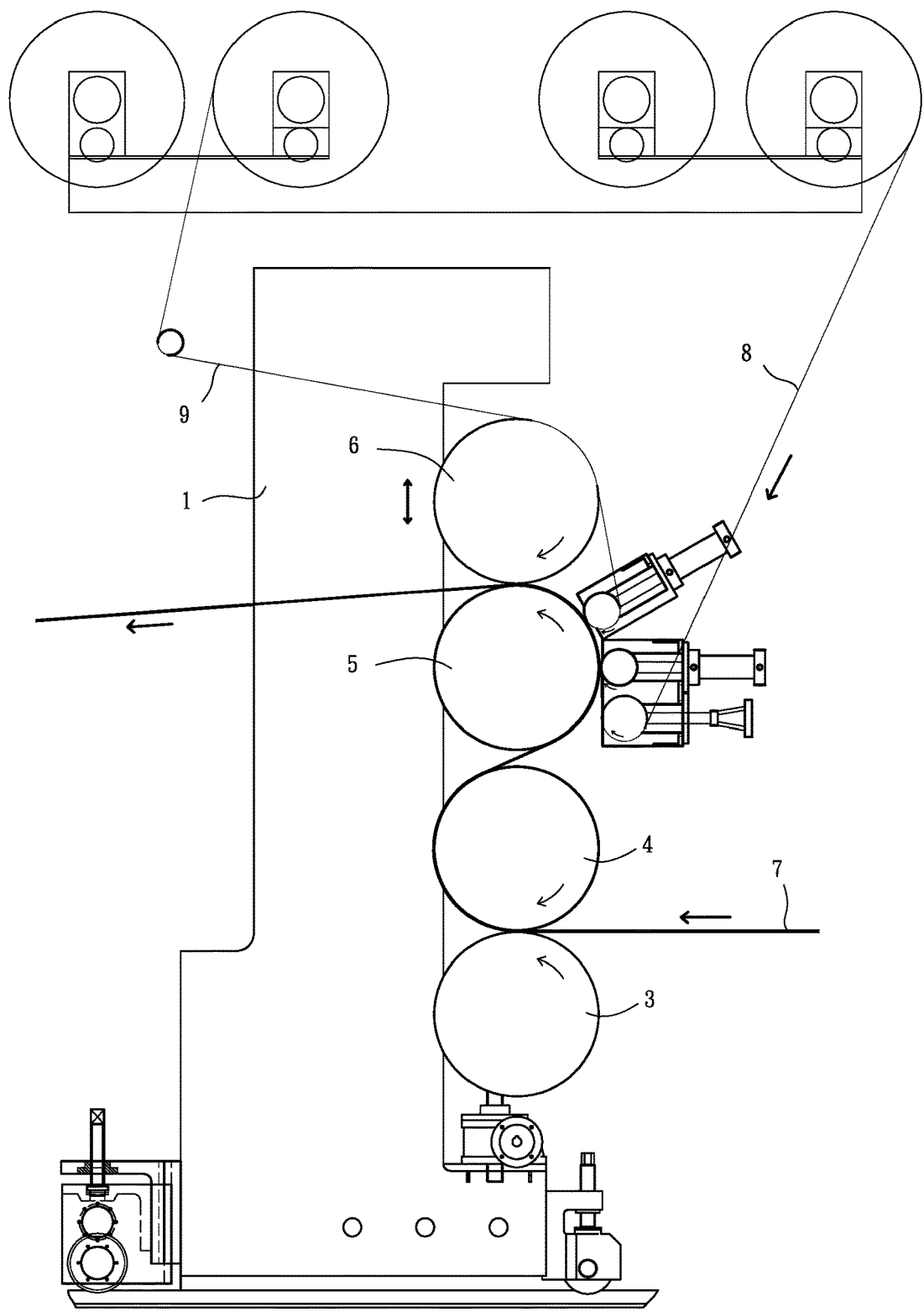
FIG. 9 is a schematic view of conventional equipment of forming plastic flooring.

As shown in FIG. 8, the substrate 11 includes a first sheet 111 made of PVC material in which plasticizer is added so that the first sheet 111 is flexible, a second sheet 112 located on the first sheet 111 and made of PVC material in which vesicant is added so that the second sheet 112 is flexible, a third sheet 113 located on the second sheet 112 and made of PVC material in which the vesicant and the plasticizer are not added so that the third sheet 113 is stiff, a fourth sheet 114 located on the third sheet 113 and made of PVC material in which the vesicant is added so that the fourth sheet 114 is flexible, and a fifth sheet 115 located on the fourth sheet 114, wherein the fifth sheet 115 is made of PVC material in which the vesicant and the plasticizer are not added so that the fifth sheet 115 is stiff.

The printing layer 12 has textures printed thereon and is arranged on a top of the substrate 11.

The abrasion resistant layer 13 is transparent and is formed on the printing layer 12 so as to enhance abrasion resistance of the plastic flooring 10.

Preferably, each of the multiple extruders is configured to extrude different melted plastic materials into each of the at least one sheet. In one embodiment, the material distributor 24 is configured to distribute the different melted plastic materials into two of the multiple extruders so that three sheets form on the substrate 11. In another embodiment, the material distributor 24 is configured to distribute the multiple extruders into three of the at least one material feeder so that five sheets form on the substrate 11.

Thereby, the plastic flooring 10 is stiff and flexible and is manufactured in an automation manner.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. Equipment of forming layering structure of plastic flooring comprising:
   a co-extrusion unit, a first rolling mechanism, a second rolling mechanism, and a roller unit;
   wherein the co-extrusion unit includes a first extruder, a second extruder, a third extruder, and a material distributor, wherein the first, second, third extruders are configured to extrude different melted plastic materials, and a respective one of multiple guide tubes is defined between an opening of each of the first, second, third extruders and a first end portion of the material distributor so as to guide the melted plastic materials to the material distributor, wherein the material distributor has multiple conduits configured to gather the melted plastic materials from the first, second, third extruders, and a substrate is extrusion molded from a supply head of a second end portion of the material distributor opposite to the first end portion of the material distributor;
   wherein the first rolling mechanism is configured to roll and to deliver an abrasion resistant layer to the roller unit;
   wherein the second rolling mechanism is configured to roll and deliver a printing layer to the roller unit; and
   wherein the roller unit is mounted on a support frame and includes a first delivery roller, a second delivery roller, a contact roller, two pattern rollers, a first guide roller, a second guide roller, and a third guide roller which are arranged along a horizontal direction of the support frame, wherein the first delivery roller is fixed above a top of the support frame, and the second delivery roller is defined between the first delivery roller and the support frame, alternatively, the first delivery roller is fixed beside an end of the support frame, and the second delivery roller is defined between the first delivery roller and the support frame; the contact roller is located on the top or the end of the support frame and beside the first delivery roller and the second delivery roller, the first delivery roller and the second delivery roller correspond to the co-extrusion unit to roll and press the substrate to as to form the substrate having a predetermined thickness and to deliver the substrate to the two pattern rollers opposite to the supply head of the material distributor;
   wherein a diameter of the contact roller is more than a diameter of each of the first delivery roller and the second delivery roller, the first guide roller is arranged on the contact roller, the second guide roller is arranged beside the contact roller and the first guide roller, and the third guide roller is fixed beside the contact roller and the second guide roller away from the first guide roller, wherein the first guide roller is configured to deliver the substrate to the contact roller, the second guide roller is configured to deliver the printing layer to the contact roller, and the third guide roller is configured to deliver the abrasion resistant layer to the contact roller, such that the substrate, the printing layer, and the abrasion resistant layer are rolled and pressed by the contact roller matingly, wherein the printing layer stacks on the substrate, and the abrasion resistant layer stacks on the printing layer after the substrate, the printing layer, and the abrasion resistant layer are rolled and pressed to produce the layering structure.

2. A method of forming a layering structure of a plastic flooring comprises steps of:
   A) providing equipment comprising a co-extrusion unit, a first rolling mechanism, a second rolling mechanism, and a roller unit wherein the co-extrusion unit includes a first extruder, a second extruder, a third extruder, and a material distributor, wherein the first, second, third extruders are configured to extrude different melted plastic materials, and a respective one of multiple guide tubes is defined between an opening of each of the first, second, third extruders and a first end portion of the material distributor, wherein the material distributor has multiple conduits configured to gather the melted plastic materials from the first, second, third extruder;
   wherein the roller unit is mounted on a support frame and includes a first delivery roller, a second delivery roller, a contact roller, two pattern rollers, a first guide roller, a second guide roller, and a third guide roller which are arranged along a horizontal direction of the support frame, wherein the first delivery roller is fixed above a top of the support frame, and the second delivery roller is defined between the first delivery roller and the support frame, alternatively, the first delivery roller is fixed beside an end of the support frame, and the second delivery roller is defined between the first delivery roller and the support frame; the contact roller is located on the top or the end of the support frame and beside the first delivery roller and the second delivery roller,
   wherein a diameter of the contact roller is more than a diameter of each of the first delivery roller and the second delivery roller, the first guide roller is arranged on the contact roller, the second guide roller is arranged beside the contact roller and the first guide roller, and the third guide roller is fixed beside the contact roller and the second guide roller away from the first guide roller;
   B) forming a substrate using the co-extrusion unit wherein the substrate includes at least two sheets, and a hardness of a first sheet is different from a hardness of a second sheet, and the substrate is delivered to the roller unit;

C) delivering a printing layer, wherein the printing layer has predetermined textures formed on an outer surface thereof and is delivered to the roller unit by the second rolling mechanism;

D) delivering an abrasion resistant layer, wherein the abrasion resistant layer is delivered to the roller unit by the first rolling mechanism;

E) rolling and pressing the substrate, the printing layer, and the abrasion resistant layer by way of the roller unit in following sub-steps of:

E1) forming a predetermined thickness of the substrate and delivering the substrate to the contact roller, wherein the substrate is made of the different melted plastic materials from a supply head of the material distributor and is delivered to the contact roller via the first delivery roller, the second delivery roller, and the first guide roller;

E2) delivering the printing layer to the contact roller via the second guide roller so as to contact the printing layer with the substrate on the contact roller;

E3) delivering the abrasion resistant layer to the contact roller via the third guide roller so as to contact and stack the abrasion resistant layer with the printing layer on the contact roller;

E4) contacting and stacking the substrate, the printing layer, and the abrasion resistant layer on the contact roller to form the layering structure, wherein the layering structure is delivered to the two pattern rollers via a fourth guide roller; and E5) forming patterns on the layering structure by using the two pattern rollers.

3. The method as claimed in claim 2, wherein the first sheet is made of PVC material in which insert gas is fed so as to foam the first sheet, and the second sheet is made of PVC material in which the plasticizer is added so that the second sheet is flexible.

* * * * *